(12) United States Patent
Newenhizen et al.

(10) Patent No.: US 6,358,421 B1
(45) Date of Patent: Mar. 19, 2002

(54) METHOD FOR COUNTERCURRENT REGENERATION OF AN ION EXCHANGE RESIN BED

(75) Inventors: John Van Newenhizen, Mundelein; Gene Verne Wayman, Fox River Grove, both of IL (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/551,588

(22) Filed: Apr. 18, 2000

(51) Int. Cl.[7] .................................. B01J 49/00
(52) U.S. Cl. ................ 210/673; 210/674; 210/678; 521/26
(58) Field of Search ................ 210/673, 674, 210/678, 269, 275, 190, 191; 521/26

(56) References Cited

U.S. PATENT DOCUMENTS

| | | | | |
|---|---|---|---|---|
| 2,855,364 A | * | 10/1958 | Roberts | 210/275 |
| 2,891,007 A | * | 6/1959 | Caskey et al. | 210/678 |
| 3,691,109 A | * | 9/1972 | Larsen | 521/26 |
| 4,172,185 A | | 10/1979 | Petheram | 521/26 |
| 4,299,922 A | | 11/1981 | Höll et al. | 521/26 |
| 4,448,693 A | | 5/1984 | Kiechling et al. | 210/673 |
| 4,839,086 A | * | 6/1989 | Zaid | 210/674 |
| 5,082,567 A | | 1/1992 | Fritts et al. | 210/673 |
| 5,460,724 A | | 10/1995 | Schwering et al. | 210/678 |
| 5,464,532 A | * | 11/1995 | Nowlin et al. | 210/190 |
| 5,955,510 A | | 9/1999 | Wang | 521/26 |

* cited by examiner

*Primary Examiner*—Ivars Cintins
(74) *Attorney, Agent, or Firm*—Greer, Burns & Crain, Ltd.

(57) ABSTRACT

An improved method for regenerating ion exchange resin in a treatment tank having a flow direction, which includes the steps of providing a supply of regenerant under pressure into the tank, and introducing the regenerant into the tank in an opposite flow direction to the treatment flow direction. In the preferred embodiment, the regenerant is a combination of $CO_2$ which is mixed with water to form carbonic acid and citric acid. This mixture is then introduced into the treatment tank without storage.

6 Claims, 8 Drawing Sheets

Regeneration Parameter Table For 12" Tank With Co-Current Flow

| Regen # | Regeneration Parameters |
|---|---|
| 1 | Well water, co-current flow @105 psi and 1 gpm |
| 2 | Soft water, holding tank, co-current flow @105 psi and 1 gpm |
| 3 | Soft water, holding tank, co-current flow @135 psi and 1 gpm |
| 4 | DI water, holding tank, co-current flow @135 psi and 1 gpm |
| 5 | DI water, holding tank, co-current flow @135 psi and 1 gpm |

FIG. 2

Regeneration Parameter Table For 12" Tank With Counter-Current Flow

| Regen # | Parameters |
|---|---|
| 1 | Regeneration with $CO_2$ & soft water @ 90 psi, flow @ ~1gpm regen for 2hr using back pressure regulator and 2 - 12" holding tanks of regen water sparged with CO2 overnight |
| 2 | Regeneration with CO2 and soft water @ 130 psi, upflow @ 1.4 gpm regen for 2hr using back pressure regulator - also an initial back flush with tap water to raise the bed |
| 3 | Regeneration with CO2 & RO water @ 130 psi, upflow @ 1 gpm for 2hr using back pressure regulator |

FIG. 4

Regeneration Parameter Table

| Regen # | Parameters | Subsequent Resin |
|---|---|---|
| 1 | Regeneration with CO2 @ 130 psi, upflow @ 1 gpm RO* water regen for 2hr using back pressure regulator | 0 |
| 2 | Regeneration with citric acid alone @ 100 psi, upflow @ 0.5 gpm RO water with ~ 1% citric acid regen for 2hr using back pressure regulator - | 538 |
| 3 | Regeneration with CO2 and citric acid @ 100 psi, upflow @ 0.5 gpm RO water with ~ 1% citric acid regen for 2hr using back pressure regulator - | 608 |
| 4 | Regeneration with CO2 and citric acid @ 100 psi, upflow @ 0.5 gpm RO water with ~ 1% citric acid regen for 2hr using back pressure regulator - | 550 |

FIG. 7

METHOD FOR COUNTERCURRENT REGENERATION OF AN ION EXCHANGE RESIN BED

BACKGROUND OF THE INVENTION

The present invention relates to a method and an apparatus for regenerating ion exchange resin in a water treatment tank. More specifically, the present invention relates to water treatment systems having weak acid cation type resin beds and using an existing source of carbon dioxide ($CO_2$) for the regeneration of the resin.

In the majority of systems used to treat water intended for consumption, as in the production of beverages, the levels of various ions present in the influent water, like hardness or alkalinity are reduced. Typical ionic reductions vary depending on the quality of the feedwater source, but it is desirable to have some level of certain ionic species remaining after the treatment process. Removal of nearly all the ions present in the influent water may adversely affect the taste of the final product.

Drinking water treatment systems that make use of ion exchange technology, such as water softeners or dealkalyzers, typically include a treatment tank containing an ion exchange resin bed of bead-like granules. Ion exchange processes, which are described in further detail in U.S. Pat. No. 4,172,185, incorporated by reference herein, generally involve a reversible chemical reaction between a solid ion exchanger and an aqueous solution, where ions are transferred between the exchanger and the solution. Specifically, undesirable ions from the influent solution are exchanged on the resin, while more desirable ions are released from the resin. After a certain period of time, the ion exchange sites on the resin become saturated with the undesirable ions and must be regenerated.

It is common to use strong acid, such as sulfuric or hydrochloric acid, to most effectively regenerate the ion exchange resin following the ion exchange process. The acid, at an adequate concentration, is conventionally introduced into the tank and flows through the bed, displacing previously exchanged ions such as calcium, magnesium, and all other cationic species from the resin exchange sites. At the conclusion of regeneration, the regenerant acid is routed out to the drain, and the resin bed is rinsed with influent or other treated water prior to returning to the service phase.

A problem with these conventional regenerants is that they are best suited to larger scale commercial or industrial applications, and are not readily adaptable to smaller applications such as in the restaurant or food service setting because of regeneration safety issues. Acids at the concentrations required for regeneration are very hazardous to humans as well as corrosive to the regeneration equipment, and therefore impart safety concerns that require specialized handling. As a result, an alternative technology making use of less hazardous acids or regenerants, such citric acid and carbonic acid, is used. When using these alternate regenerants, the process is typically preformed in two separate tanks. More specifically, a separate solution tank is used to prepare a carbonic acid solution, and it is then delivered into the resin tank under pressure to regenerate the ion exchange resin. A separate regenerant tank is needed because a minimum storage time is required to generate an effective amount of dissolved carbonic acid regenerant for use with the ion exchange resin. This can take as long as several hours.

One problem with using this procedure is that the use of two tanks takes up a substantial amount of floor space, which can be a severe limitation at many facilities, as well as increasing the capital and operational cost of such systems due to multiple tanks and associated transfer equipment. In addition, the long time period required for creating the $CO_2$ solution, and the long contact time required during the regeneration process using $CO_2$ alone is inconvenient and increases cost.

Another disadvantage of conventional systems is that $CO_2$ is a gas at ambient pressure and temperature, making handling more difficult and presenting a special problem in conventional systems. When preparing a $CO_2$ solution and transferring it within the system, it must remain pressurized. Any reduction in pressure during operation will allow $CO_2$ gas to escape from solution. This reduces the concentration delivered to the resin bed and therefore the effectiveness of the regeneration process. The regeneration is incomplete, and the capacity of the regenerated tank is reduced. The $CO_2$ concentration delivered to the resin tank is directly dependent on the temperature and pressure of the system. This restricts the concentration of regenerant to the highest pressure the system can handle and the lowest temperature at which it can be maintained. Many potential applications of this treatment process will be limited to less than 100 psi and room temperature. Therefore, this places a severe limitation on the concentration of $CO_2$ in the regenerant solution and the regeneration process.

Accordingly, an object of the present invention is to provide an improved method and apparatus for regenerating ion exchange resin that is more efficient in the use of space than conventional systems by reducing the number of tanks required for regeneration.

Another object of the present invention is to provide an improved method and apparatus for regenerating ion exchange resin that is more cost effective.

Yet another object of the present invention is to provide an improved method and apparatus for regenerating ion exchange resin in a shorter time period.

Still another object of the present invention is to provide an improved method and apparatus for regenerating ion exchange resin that does not require the storage of the regenerant in a regenerant tank to achieve saturation.

A further object of the present invention is to provide an improved method and apparatus for regenerating ion exchange resin that creates the regenerant in the treatment tank.

Yet a further object of the present invention is to provide for the use of non-hazardous chemicals in the regeneration process.

Still a further object of the present invention is to provide an effective regeneration process at pressures less than 100 psi and at room temperature.

Another further object of the present invention is to perform the regeneration of the ion exchange materials in such a manner as to not completely remove all of the ions from the influent water supply.

BRIEF SUMMARY OF THE INVENTION

The above-listed objects are met or exceeded by the present improved method and apparatus for regenerating ion exchange resin, which features the introduction of the regenerant into the treatment tank in an opposite flow direction to the treatment flow direction. The present method and apparatus also reduces the amount of required space by introducing the regenerant directly into the tank, which also eliminates the need for a long regenerant storage time. In fact, the present invention is especially suitable for food service sites serving carbonated beverages, because the already available source of $CO_2$ can be used to supply carbonic acid regenerant from the existing equipment to the ion exchange system. Another advantage of the present method and apparatus is that the regenerant can be created, transferred and simultaneously begin regeneration of the ion exchange resin in the treatment tank.

Efficiency of the present method for regenerating ion exchange resin is further improved by adding citric acid to the carbonic acid regenerant. It has been shown that adding citric acid to carbonic acid speeds up regeneration significantly. The addition of citric acid increases the rate at which hardness is discharged from the resin beads during the regeneration process, resulting in a dramatic reduction in the time required for a similar level of regeneration using $CO_2$ alone. A shorter regeneration time also leads to a reduction in costs associated with higher consumption of $CO_2$ gas and a reduction in the water used and discarded during an extended $CO_2$ regeneration period. An advantage of the present system is that the addition of citric acid can reduce the typical regeneration time from approximately 8 hours down to 2 hours while providing the desired regeneration levels in the ion exchange resin. The handling of a solution of approximately 1% citric acid is significantly safer than handling either a more concentrated solution of a mineral acid (i.e., hydrochloric acid) or a highly compressed gas ($CO_2$). Additionally, the citric acid delivery system is much less complex than that of a gas such as $CO_2$. Safety in handling and reduced investment in time, capital equipment, water, and $CO_2$ gas, as well availability work together to greatly reduce regeneration costs when citric acid is used to supplement $CO_2$ regeneration. Testing further shows that there is a synergistic impact when $CO_2$ and citric acid are used together in regeneration.

More specifically, the present invention provides a method for regenerating ion exchange resin in a treatment tank with a flow direction, which includes the steps of providing a supply of regenerant under pressure into the tank and introducing the regenerant into the tank in an opposite flow direction to the treatment flow direction.

In another embodiment, the present invention provides a water treatment apparatus including an ion exchange tank for generation of treated water, where the tank has an upper end and a lower end, and a treatment flow direction. An ion exchange resin is disposed in the tank for treating water. The present water treatment apparatus also includes a delivery structure for providing a supply of regenerant under pressure and an introduction structure for introducing the regenerant into the tank in an opposite flow direction to the treatment flow direction.

BRIEF DESCRIPTION OF THE DRAWINGS

FIG. 2 is a table setting out the parameters for regeneration tests conducted by providing the regenerant in a co-current flow direction into the tank;

FIG. 4 is a table setting out the parameters for regeneration tests conducted by providing the regenerant in a countercurrent flow direction into the tank;

FIG. 7 is a table setting out the parameters for regeneration tests conducted with and without adding citric acid.

DETAILED DESCRIPTION OF THE INVENTION

Figure 1:
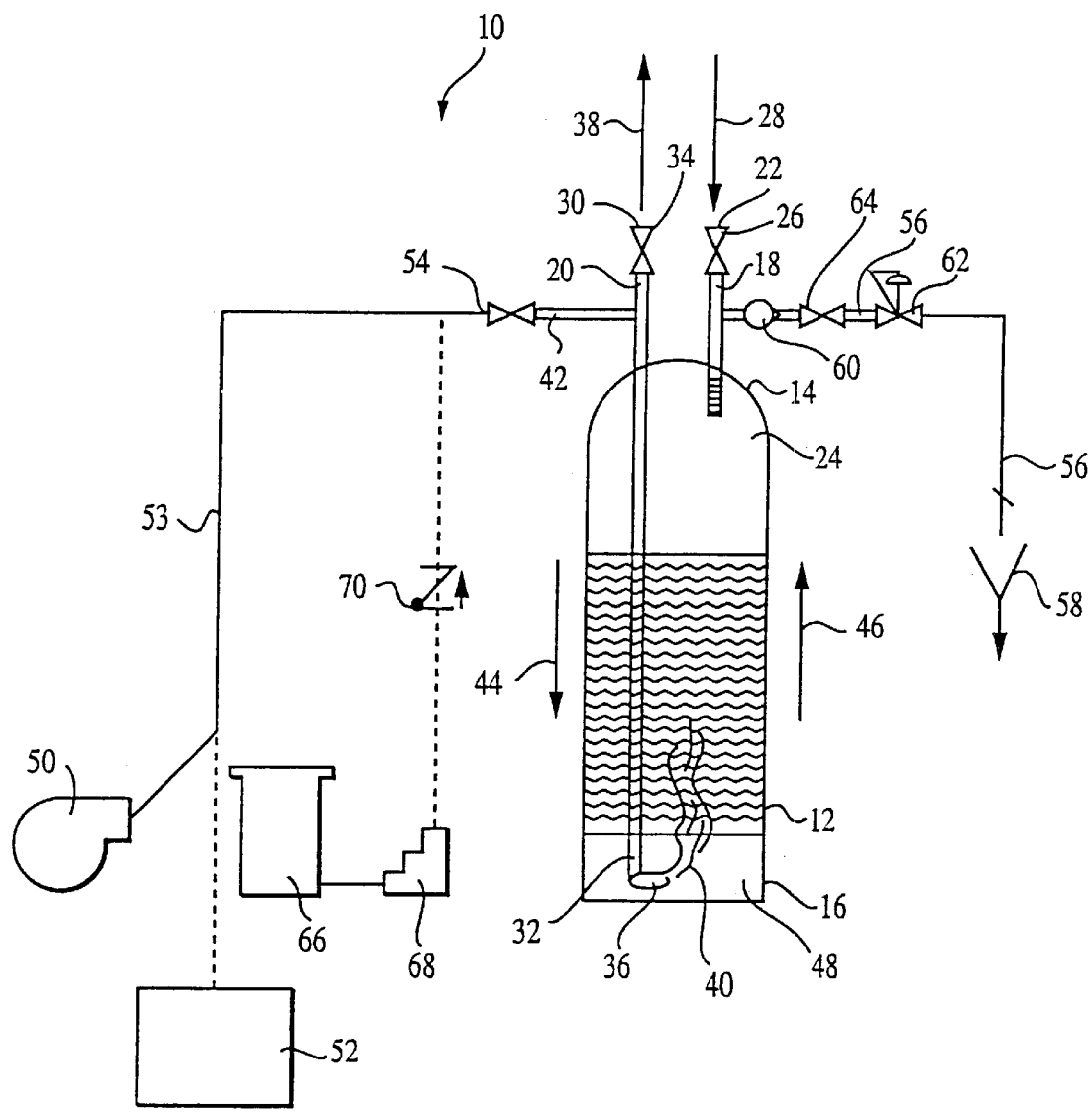
FIG. 1 is a schematic diagram of an ion exchange resin regeneration system in which the present method is preferably applied.

Referring now to FIG. 1, the present ion exchange resin regeneration system, which is suitable for use with the present method, is shown schematically and is generally designated at 10. As shown in FIG. 1, a treatment tank 12 having an upper end 14 and lower end 16 has a service inlet 18 and a service outlet 20. The service inlet 18 has a top 22 and a bottom 24. A service inlet valve 26 is preferably connected to the top 22 of the service inlet 18, and controls the intake of water into the treatment tank 12. In the preferred embodiment, the bottom 24 of the service inlet 18 is placed within the tank 12, just beneath the upper end 14 of the tank. For best results, the bottom end of the service inlet 18 is constructed and arranged to not contact the solutions within the tank 12. Instead, it is generally used for delivering raw water 28 into the tank.

The service outlet 20 also has a top end 30 and a bottom end 32. Furthermore, the service outlet 20 similarly has a service outlet valve 34 at the top end 30 for controlling the outflow of treated water. However, the bottom end 32 of the service outlet 20 extends all the way to the lower end 16 of the tank 12, which places the service outlet within the treatment solution. An outflow attachment 36 is connected to the service outlet 20, which gives the inlet service an "L" shape as depicted in FIG. 1. It should be noted that alternative shapes for the attachment 36 are contemplated as long as the service outlet 20 can release the regenerant at the lower end 16 of the tank 12. Thus, while the service outlet 20 is generally used to transport treated water 38 from the tank 12, in the present system, the service outlet is also used for delivering regenerant solutions into the tank.

More specifically, a supply of regenerant 40 is provided under pressure into the tank 12 through a regenerant inlet 42 in fluid communication with the service outlet 20 as shown in FIG. 1. Generally, the tank 12 has a down flow direction 44, for the treatment of water 28 introduced through the service inlet 18, and the configuration of the service outlet 20 allows the treated water to flow in an opposite direction 46. In the present system, the regenerant 40 is preferably introduced in an upward flow direction 46 into the tank. As is known in the art, the regenerant 40 is used to regenerate an ion exchange resin bed 48 at the lower end 16 of the tank 12, when the bed becomes saturated with positive "hardness" ions. An important feature of the present system is that the regenerant 40 is released into the ion exchange resin bed 48 directly, expeditiously after its creation and without prior storage, so that the concentration of the regenerant is most effective.

In the preferred embodiment, carbonic acid is used as the regenerant 40. However, it should be understood that the use of other weak acid solutions are known in the art, and are within the scope of the present invention. As shown in FIG. 1, the carbonic acid 40 is created by mixing $CO_2$ with water, which is contemplated as being accomplished in at least two ways.

Since the preferred contemplated environment for the present system 10 is a food service establishment with an existing source of $CO_2$ for carbonating beverages, that source of $CO_2$ will be designated 50. One way to create carbonic acid is to mix filtered water from a treatment unit 52 with carbon dioxide outside the tank 12, creating carbonic acid 40 that is to be introduced into the tank. In particular, the carbonic acid 40 is provided in a pressurized line 53 which is in fluid communication with the tank 12 through the inlet 42. A regenerant valve 54 is the point of connection between the line 53 and the regenerant inlet 42 near the connection to the outlet service valve 34. The regenerant valve 54 controls the flow of the regenerant 40 to the tank 12.

Once the carbonic acid regenerant 40 enters the service outlet 20, it travels under pressure to the bottom end 32, where it is released directly into the ion exchange resin bed 48. Because of the configuration of the outflow attachment 36, the carbonic acid 40 flows in an upward direction 46. In this manner, the carbonic acid 40 is actually being delivered directly to the ion exchange resin bed 48 to immediately begin the regeneration of the ion exchange bed. As a result of the countercurrent flow direction 46 of the carbonic acid 40 in the present system 10, it need not be stored at a second tank for it to reach the proper concentration for a down flow delivery 44 to the tank 12. Instead, the carbonic acid 40 is already at the proper concentration when it is delivered. In addition, the countercurrent flow direction 46 also allows a longer time for the carbonic acid 40 to regenerate the ion exchange bed 48 before it becomes diluted. More specifically, due to a longer time period required for the carbonic acid 40 to flow to the upper end 14 of the tank 12, it actually regenerates the ion exchange bed 48 for a longer time at a stronger concentration than would a down flow delivery.

The second way to create the carbonic acid is to provide pressurized carbon dioxide from the source 50 directly into the tank 12 without premixing with filtered water. Again, because of the connection of the regenerant inlet 42 to the service outlet 20, the carbon dioxide 44 flows in an opposite direction 46 to the tank's flow direction 44. Since there is already raw water in the tank 12, the countercurrent flow direction 46 of the carbon dioxide allows it to mix with the water, creating carbonic acid in the tank simultaneously as the carbonic acid regenerates the resin 48. In particular, the countercurrent flow direction 46 facilitates the simultaneous creation of carbonic acid and the regeneration, which occurs in a single tank.

With either method of creating the carbonic acid regenerant 40, the regenerant in both cases is provided under pressure into the tank 12. Furthermore, it is preferred that a specific pressure is maintained in the tank. Good results are achieved when the pressure is at least 90 psi, and a range of between about 90 to 140 pounds per square inch (psi) is preferred. To this end, a drain pipe 56 is connected to the service inlet 18 to release excessive pressure from the tank, and the pipe 56 extends downward to a drain 58. A flow control valve 60 connects the drain pipe 56 to the service inlet 18, and maintains the pressure at a specified level in the tank. A back pressure regulator valve 62 is provided adjacent to the flow control valve 60 and is connected to the service inlet 18 for regulating the pressure. A valve 64 is also connected between the flow control valve 60 and the back pressure regulator valve 62 for providing a mineral shutoff capability for the drain pipe 56. As is known in the art, the number, type and arrangement of valves may vary with the application.

Also, regardless of which method of creating the carbonic acid regenerant 40 is used, it is preferred that a source of citric acid be added as well. In the preferred embodiment, a container 66 of citric acid solution is provided and is in fluid communication with the regenerant inlet 42. The citric acid can be added directly to the ion exchange resin 48, or it can be added to the carbonic acid 40. A metering pump 68 connected to a check valve 70 are used for transporting the citric acid from the container 66 to the regenerant inlet 42.

Turning now to FIGS. 2–5, the results of comparison tests are provided to establish the differences in regenerant performance between the present countercurrent flow and conventional flow or co-current treatment. The regeneration was carried out by providing water and $CO_2$ to a carbonator at a pressure of 90–140 psi. In the carbonator, the $CO_2$ was dissolved into water and then fed to the tank 12. Each regeneration was conducted over an "on" cycle of 10 minutes, which is when the regenerant is being provided to the tank 12. Then, the "on" cycle was followed by an "off" cycle of 10 minutes, in which the regenerant was not provided to the tank 12. This "on/off" cycle was repeated during the two-hour period to simulate real world usage. After the two-hour period, samples were taken and the hardness was measured by the EDTA titration test using crystalline acid, $C_{10}H_{16}N_2O_8$. Using this EDTA titration test, the capacity of the resin was measured in gallons of water treated until the hardness exceeded 100 parts per million (ppm) as $CaCO_3$. For a twelve inch tank, the experiments demonstrate that a countercurrent flow yields much more efficient discharge of the hardness from the water. This is especially true during the early stage of regeneration, i.e. in the first 30 minutes.

Figure 3:
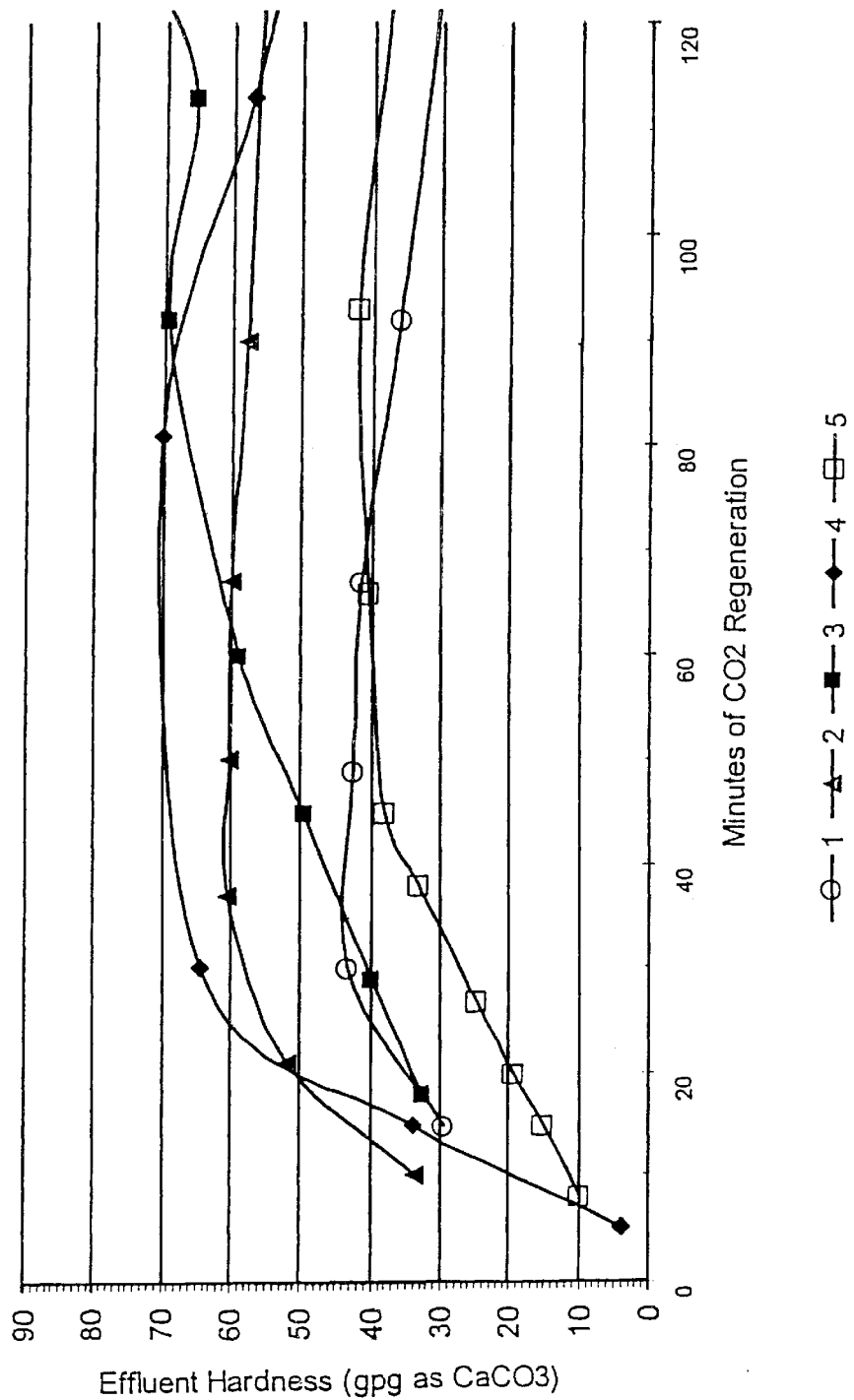
FIG. 3 is a graph of the results in FIG. 2.

Referring now to FIGS. 2 and 3, results of providing the regenerant under pressure in a co-current flow into the tank 1 and 2 with various kinds of water are provided. In a co-current flow setting, the regenerant enters at the upper end of the tank. FIG. 2 shows the parameters for each of the regenerations, which are designated by a number. For regeneration profile numbers 1 and 2, the regenerant was provided to well water and soft water at the pressure of 105 psi and 1 gallon per minute (gpm). In regeneration numbers 3, 4 and 5, the regenerant was provided to soft water and deionized water at 135 psi and 1 gpm.

Figure 5:
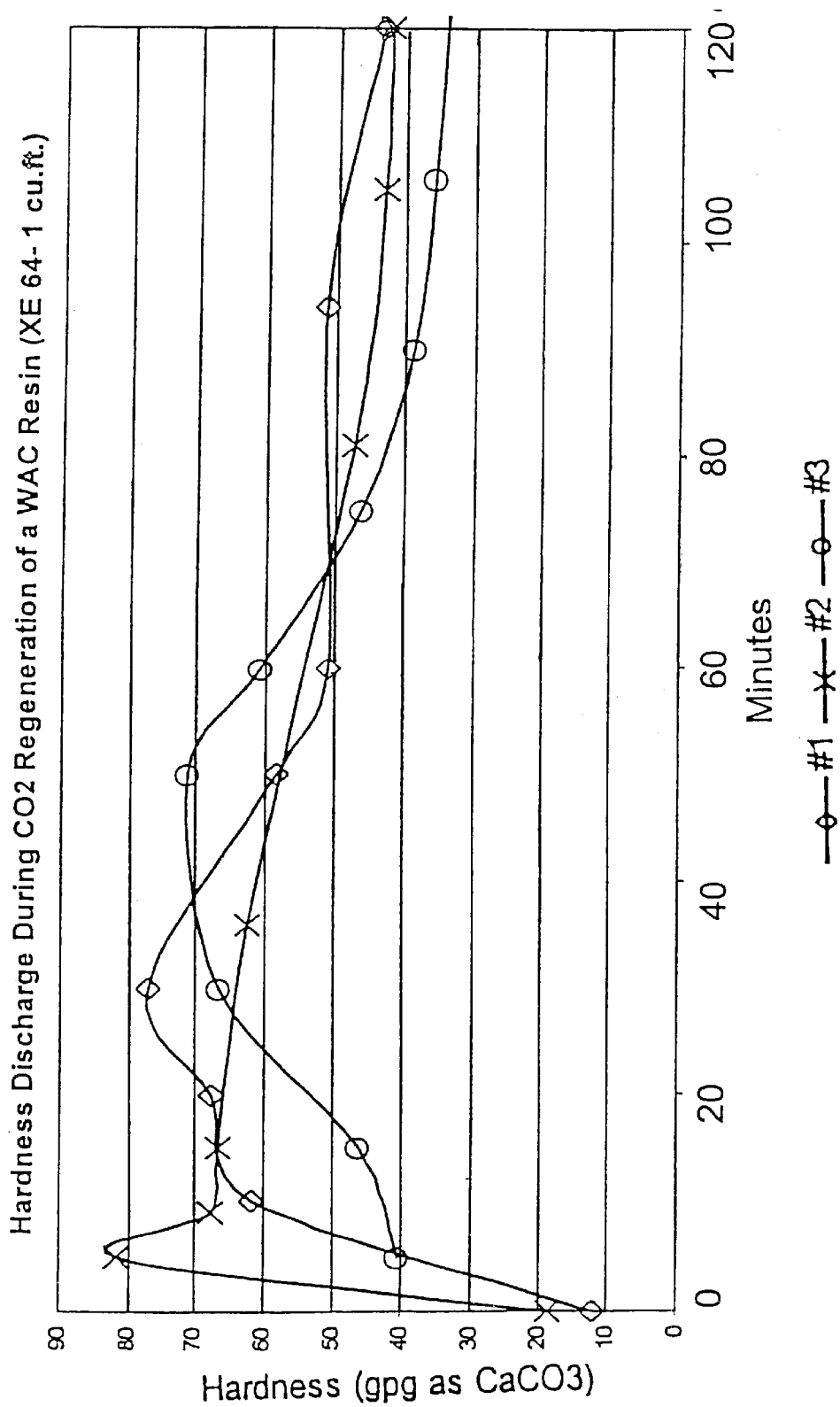
FIG. 5 is a graph of the results in FIG. 4.

Referring now to FIGS. 4 and 5, tests were conducted using the present invention for a twelve-inch tank. As described previously, the regenerant is provided under pressure into the tank in the opposite flow direction or the countercurrent flow direction. For the countercurrent flow tests, the regenerant enters directly into the ion exchange resin bed at the lower end of the tank 12 and would immediately flow upward in the tank. The parameters for each regeneration using the present invention are set out in a table in FIG. 4. Note that none of the regenerations used a holding tank to make the regenerant. The results are plotted onto a graph in FIG. 5.

As shown by FIGS. 2, 3, 4 and 5, there are significant differences in comparing the results of the co-current and countercurrent flow tests. FIG. 5 shows the initial surge in the levels of hardness being charged during the regeneration using a countercurrent flow. In comparison to FIG. 3, the levels of hardness are much more steady during the regeneration. Furthermore, the countercurrent regeneration begins displacing hardness at a rate significantly higher than the co-current regeneration. This is desirable since the water is immediately treated using the most concentrated regenerant at the beginning, resulting in a significantly shorter time span for obtaining the desired result than the co-current flow regeneration.

The traditional co-current regeneration is inferior in that the regenerant is diluted with raw water during the early stages of the regeneration. As a result, the concentration of the regenerant is reduced, which in turn reduces the rate of displacing the hardness from the resin. In contrast, the present countercurrent regeneration allows the regenerant to make immediate contact with the resin upon introduction into the tank, where the regenerant is also the most concentrated. The co-current regeneration moves up more gradually at first and then flattens out for the remainder of the cycle. On the other hand, the countercurrent increases to the highest levels and then drops back to the 30–45 gallons per grains (gpg) range, which indicates that the concentration of the carbon dioxide displaced as much hardness as the reaction will allow. More specifically, the remaining hardness concentration forces a reduction in the rate of removal. As a result, optimal hardness displacement and discharge is produced.

Figure 6:
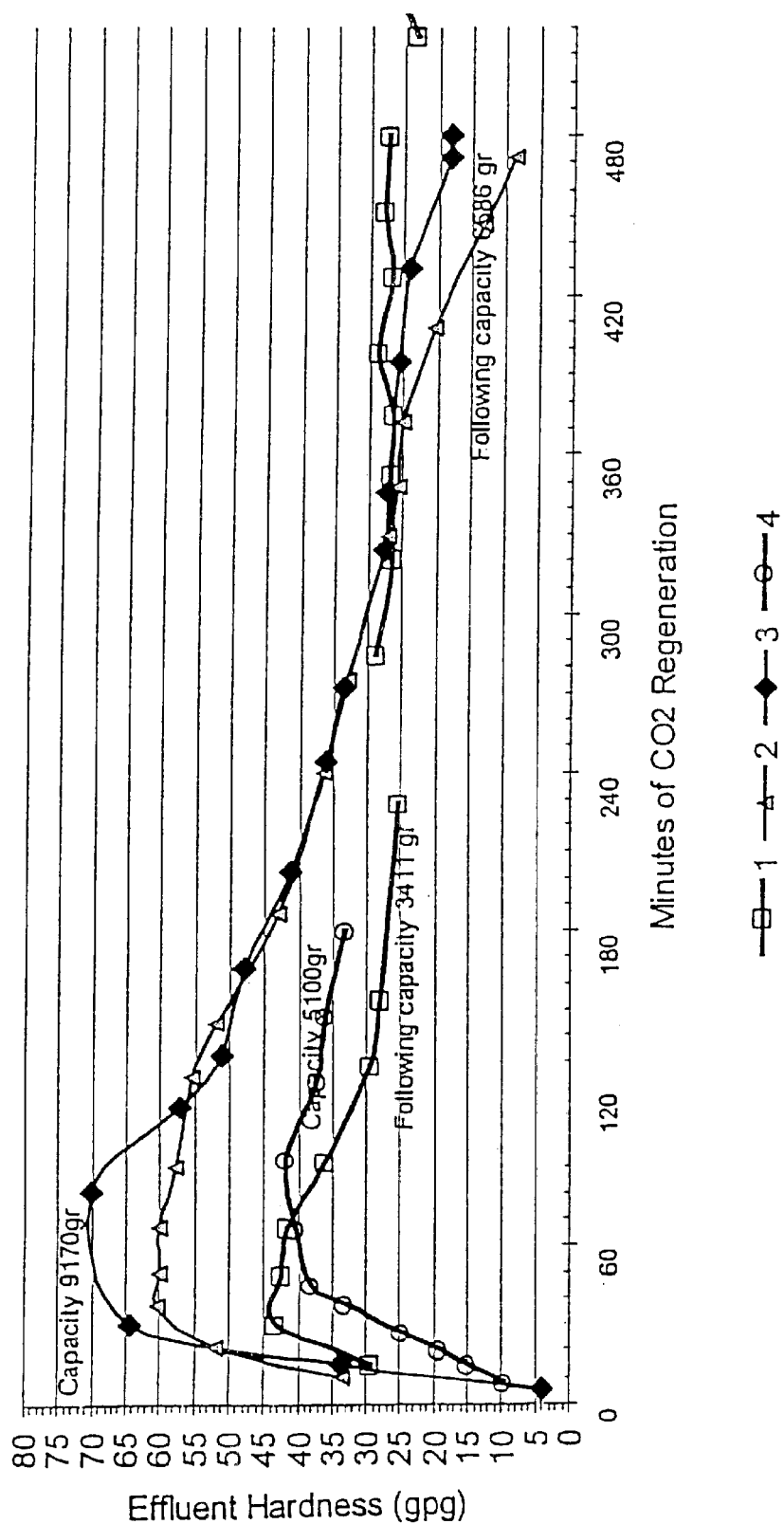
FIG. 6 is a graph of the results of using only carbon dioxide as a regenerant to regenerate the ion exchange resin.

Turning now to FIG. 6, the regeneration process is relatively slow when using only $CO_2$. The efficiency of the regeneration process using $CO_2$ or carbonic acid is dependent upon the concentration of dissolved $CO_2$, which is directly related to the pressure maintained in the system. As a result, the maintained pressure is greater when using $CO_2$, because it is a gas at room temperature. Thus, even at a working pressure as high as 135 psi, the concentration of the carbon dioxide remains too low to displace hardness from the ion exchange resin bed at an expedient rate.

As demonstrated by the graph in FIG. 6, the resin is still discharging hardness after 480 minutes, which indicates that the regeneration remains incomplete after 8 hours. Furthermore, the gentle slope of the line after a rather low initial peak reflects the weakness of the carbonic acid for displacing the hardness from the resin. This is not expedient for commercial applications, because the regeneration portion of the operating cycle is typically limited to a two hour time period.

Figure 8:
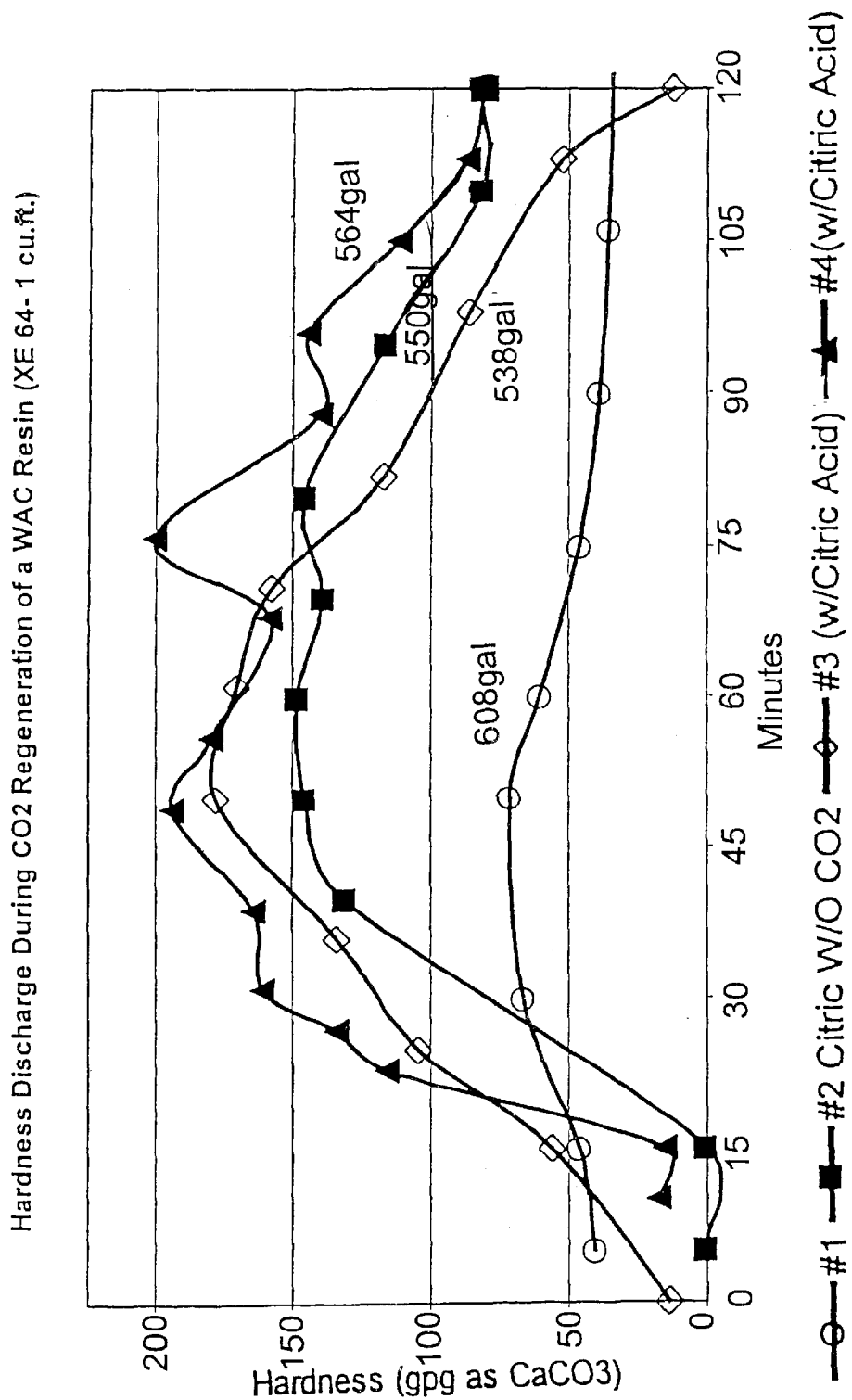
FIG. 8 is a graph of the results in FIG. 7.

Turning now to FIGS. 7 and 8, it has been shown that by adding citric acid to carbonic acid or $CO_2$, the regeneration becomes much more efficient. Several regeneration tests were conducted to show the difference in subsequent resin capacity with and without adding citric acid. The regeneration was carried out by providing reverse osmosis water and carbon dioxide gas to a carbonator at a pressure of 100 psi. The $CO_2$ is dissolved into the water and then delivered under pressure in a countercurrent flow direction through the resin bed. A stock solution of citric acid was prepared and injected into the feed line prior to entering the tank at the feed rate yielding a final concentration of approximately 1%.

Similar to the previous experiment, each regeneration was conducted over an "on" cycle of 10 minutes followed by an "off" cycle of 10 minutes. The "on/off" cycles are repeated during the two-hour period. After the two-hour period, samples were taken and the hardness was measured by the EDTA titration test. In an EDTA titration test, the capacity of the resin is measured in gallons of water treated until the hardness exceeds 100 ppm as $CaCO_3$. For a twelve inch tank, the experiments demonstrate that a countercurrent flow yields more efficient discharge of the hardness from the water. This is especially true during the early stage of regeneration.

FIG. 7 sets out the parameters and the results of these regenerations in a table, and the results are plotted as a graph in FIG. 8. As indicated, the first regeneration No. 1 was done with $CO_2$ alone. The subsequent resin capacity was zero, as indicated. This regeneration, in a two-hour period, failed to restore enough capacity to produce acceptable water quality having a hardness below 100 ppm as $CaCO_3$.

On the other hand, the following three regenerations (Nos. 2, 3 and 4) were supplemented with citric acid. All produced much greater capacities of treated water. The volume of water treated has increased significantly with the addition of citric acid. All three 2 hour regenerations restored enough resin capacity to treat over 500 gallons of influent water. This increase is a tremendous result given that, in practice, only 400 gallons are the actual standard daily operational requirement, and this requirement was satisfied within a two-hour time span. This much shorter two-hour regeneration time limit is more practical for commercial operation. However, it is clear that the combination of using carbon dioxide and citric acid, as in regeneration Nos. 3 and 4, dramatically boosted the quantity of hardness being discharged from the resin. Although regeneration No. 1, which has only citric acid, performed better than the regenerations with the carbon dioxide alone, it remains inferior to the combination of both regenerants.

The two experiments demonstrated the sufficient difference in the regeneration performance between the present invention and the previous known method. The first experiment showed that a countercurrent flow yields much more efficient discharge of the hardness from the water. Furthermore, an additional tank for storage of the regenerant for saturation is not needed, which means reduced and cost and use of space. As a result, it is very practical for use in a food service setting where availability of space may be an issue. An improved method to simultaneously create the regenerant to regenerate the resin in a single tank is also shown, which similarly removes the need for an additional tank. The present invention also dramatically shortens the time span needed to regenerate a resin tank when adding citric acid. It is now possible to produce treated water in less time, which is significantly more efficient and leads to a dramatic cost reduction for commercial usage.

While a particular embodiment of the method and apparatus for regenerating ion exchange resin has been shown and described, it will be appreciated by those skilled in the art that changes and modifications may be made thereto without departing from the invention in its broader aspects and as set forth in the following claims.

What is claimed is:

1. A method for regenerating an ion exchange resin in a single treatment tank having a flow direction, said method comprising the steps of:

mixing citric acid with a regenerant;

providing a supply of said mixture of citric acid and regenerant under pressure into the tank; and introducing said mixture of citric acid and regenerant into the tank in an opposite flow direction to said treatment flow direction;

wherein said regenerant is carbonic acid.

2. The method according to claim 1, wherein said carbonic acid is generated by mixing carbon dioxide and water in a delivery system for introducing said regenerant into the treatment tank.

3. The method according to claim 1 further including the step of maintaining a specified pressure in the treatment tank.

4. A method for regenerating an ion exchange resin in a single treatment tank having a flow direction, said method comprising the steps of:
- mixing citric acid with a regenerant;
- providing a supply of said mixture of citric acid and regenerant under pressure into the tank; and
- introducing said mixture of citric acid and regenerant into the tank in an opposite flow direction to said treatment flow direction;
- wherein said regenerant is pressurized carbon dioxide.

5. The method according to claim 4 further including mixing said carbon dioxide with water to create carbonic acid in the treatment tank to regenerate the ion exchange resin.

6. The method according to claim 5, wherein said generation of the carbonic acid and the regeneration of the ion exchange resin are performed simultaneously.

* * * * *